United States Patent [19]
Kawamoto et al.

[11] Patent Number: 5,926,188
[45] Date of Patent: Jul. 20, 1999

[54] IMAGE FORMATION SYSTEM

[75] Inventors: Koushi Kawamoto; Shoji Sakamoto; Masao Morita; Kazuto Hayashi, all of Nakai-machi, Japan

[73] Assignee: Fuji Xerox Co., Ltd., Tokyo, Japan

[21] Appl. No.: 08/743,209

[22] Filed: Nov. 5, 1996

[30] Foreign Application Priority Data

Dec. 28, 1995 [JP] Japan ................................... 7-343381

[51] Int. Cl.⁶ .................................................. G08G 1/123
[52] U.S. Cl. ............................................................ 345/435
[58] Field of Search ................................... 345/435, 433, 345/434

[56] References Cited

U.S. PATENT DOCUMENTS

| | | | |
|---|---|---|---|
| 5,333,246 | 7/1994 | Nagasaka ................................. | 345/433 |
| 5,614,895 | 3/1997 | Ohomori et al. ..................... | 345/435 X |
| 5,634,040 | 5/1997 | Her et al. ................................ | 345/435 |
| 5,638,501 | 6/1997 | Gough et al. ........................... | 345/435 |

FOREIGN PATENT DOCUMENTS

PCT/JP91/00456  10/1991  Japan .
7-104987  4/1995  Japan .

*Primary Examiner*—Cliff N. Vo
*Attorney, Agent, or Firm*—Oliff & Berridge, PLC

[57] ABSTRACT

An overlap judgment device writes job sequence divided by a job sequencing device to map memory constituted at coarser resolution than the resolution of a final generated image. At this time, if an image element where a job sequence number is already written is overwritten, the dependence of the job sequence upon processing order is extracted and if an image element is not overwritten, the independence of the job sequence is extracted. A number allocated to job sequence is written to the map memory, if an image element is overwritten, the number of the preceding job sequence is allocated to the overwritten job sequence and referred to when a final image is generated. To reduce overhead for preprocessing to judge overlap between image elements if an image formation instruction is processed in parallel as much as possible, the map memory is constituted by a plurality of planes different in resolution and overlap is judged by first writing to a plane with lower resolution and rewriting to a plane with higher resolution by one level if an image element is overwritten.

12 Claims, 14 Drawing Sheets

Fig. 4

```
                                              60
51a ─┬─ 375  175  75  0  360  arc stroke 52a ─┬─ 150  250  moveto 275  250  lineto 250  150  lineto
      closepath stroke 53a ─┬─ 250  200  125  25   text box ABCDE P 54a ─┬─ 0.0 setgray
      337.5  200  12.5  360  arc fill 55a ─┬─ 150  125  12.5  0  360  arc fill 56a ─┬─ 150  150  50  0  360  arc stroke
```

| JOB identifier | PRED |
|---|---|
| 1001 | 0 |
| 1002 | 0 |
| 1003 | 1001 |
| 1004 | 1003 |

Fig. 10

| JOB identifier | PRED | CMPLT |
|---|---|---|
| 1001 | 0 | 1 |
| 1002 | 0 | 1 |
| 1003 | 1001 | 0 |
| 1004 | 1003 | 0 |

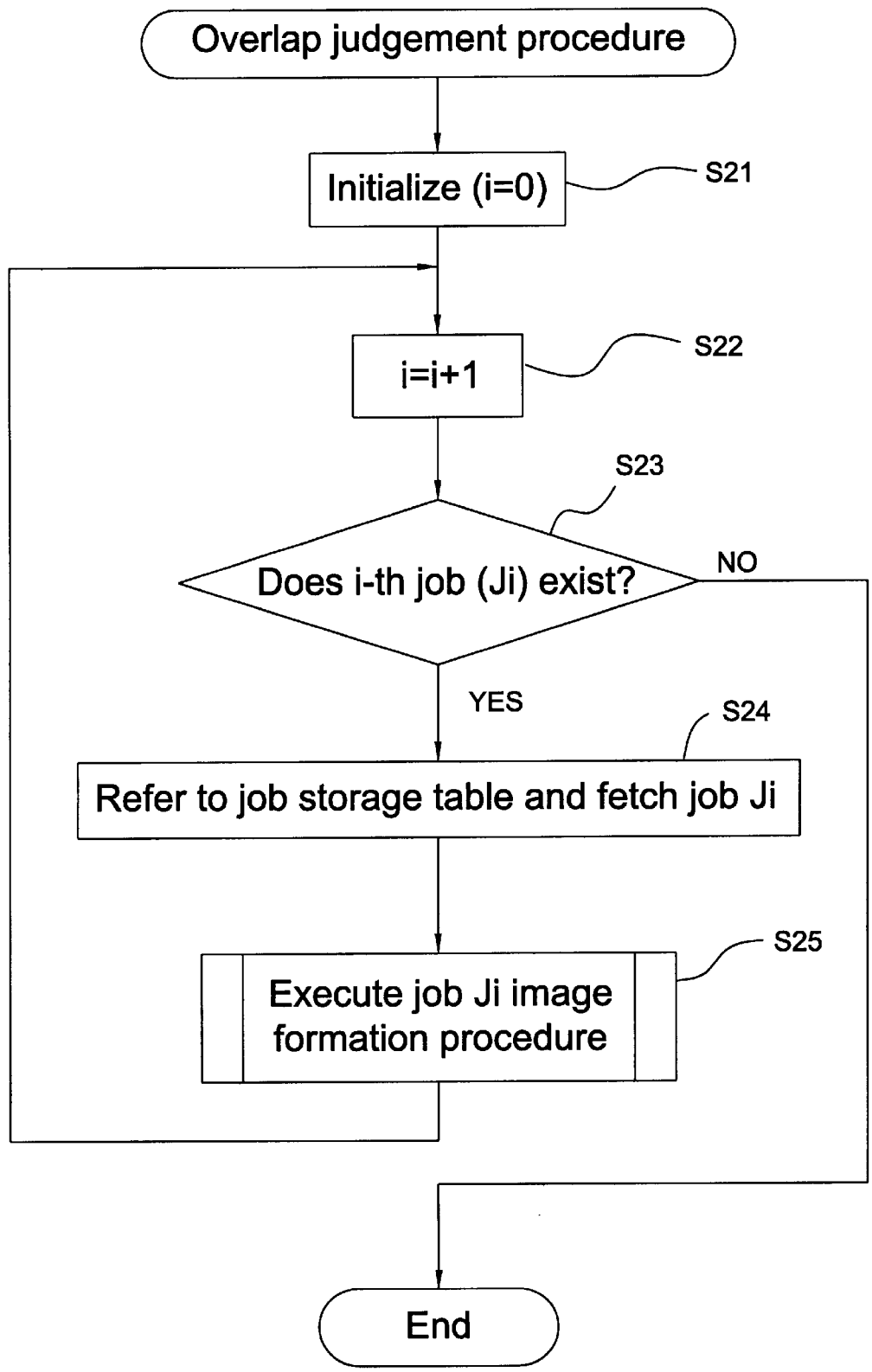

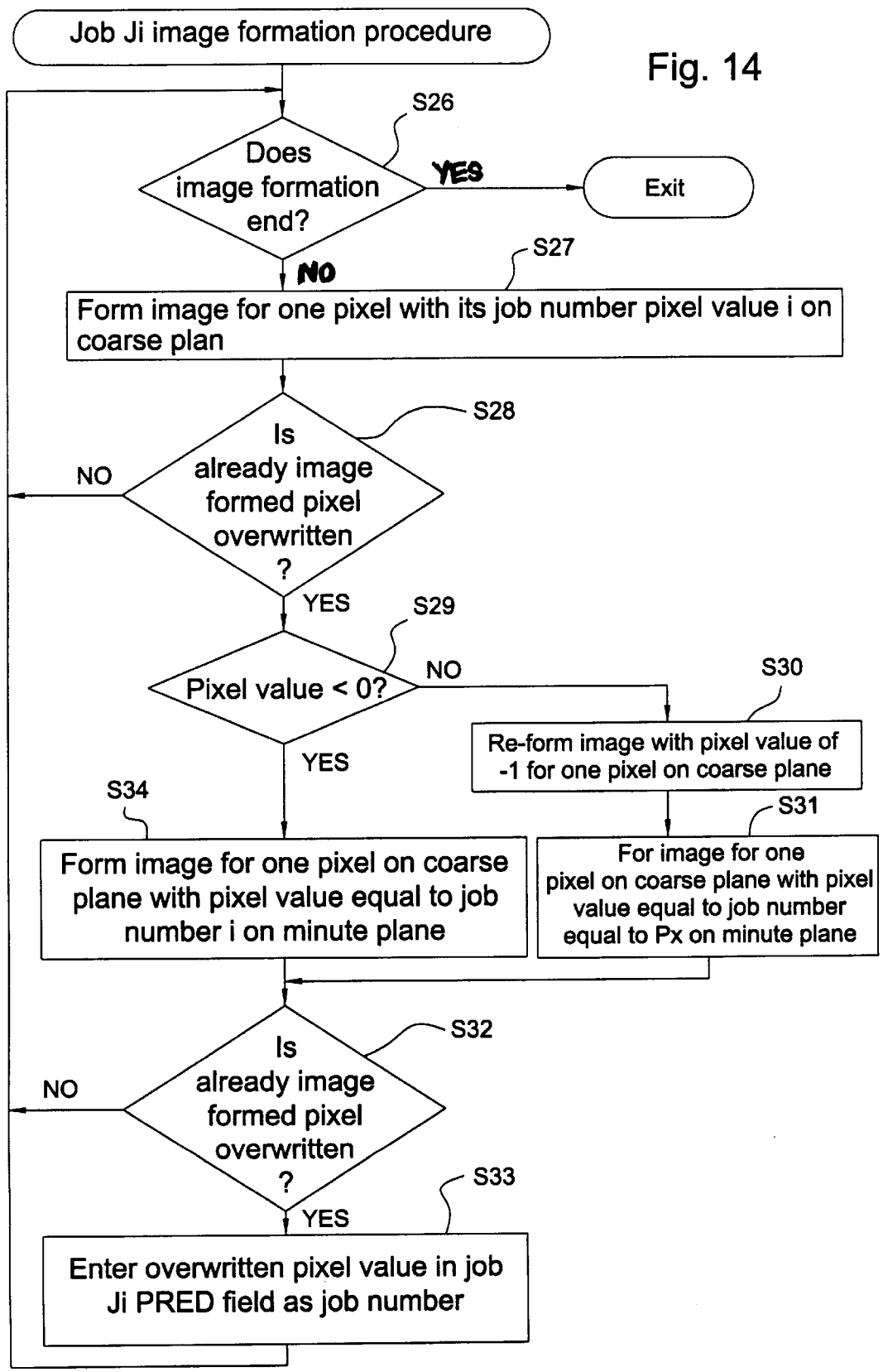

IMAGE FORMATION SYSTEM

BACKGROUND OF THE INVENTION

1. Field of the Invention

The present invention relates to an image formation system, particularly relates to an image formation system for obtaining image information by analyzing an image formation instruction represented by language for describing an image and executing it by a plurality of image formation processors.

2. Description of the Related Art

A printing control system using "page description language" which is different from the conventional printing system mainly treating of character information and treats of an image, a graphic form and a character similarly and in which the enlargement, turning and transformation of a character and a graphic form can be freely controlled has been generally popular with the development of a printer which is suitable for high-speed digital printing such as an electrophotographic system and an ink jet system. A variety of page description languages were developed in 1980s, the representative examples are PostScript (trademark of Adobe Systems) and Interpress (trademark of Xerox) and a large number of page description languages are used for a variety of printers.

A server-type page description language processing printer shared by many users must accept a print request from many host systems, interpret print information described by page description language and execute corresponding printing. If such a printer is simultaneously utilized from many host systems, print information described by page description language is serially interpreted and executed in the printer and queuing time from a print request to the acquisition of the result has a tendency to be extended. This situation has been more serious with the enhancement of printing resolution.

To form an image in a high speed, technique for interpreting and executing an image formation instruction in parallel is proposed. For example, according to technique disclosed in PCT/JP91/00456, image formation processing on a print screen is shared by a plurality of computers distributed in a network. In this case, operation for forming an image is executed in parallel as a plurality of processes by dividing a screen as an area in which an image is formed by each computer in the shape of a band or a mesh.

According to technique disclosed in Japanese Unexamined Patent Publication No. Hei 7-104987 (1995), an image operation procedure in a document printing program is analyzed and a parallel execution code for judging whether an image can be formed in parallel or not is generated by directly comparing a pixel where an image is already formed and a pixel where an image is to be formed by the execution of the next instruction.

In the above-described conventional parallel image formation system, the judgment of overlap is required whether image formation in a portion interferes with that in another portion or not, that is, whether an image by another image formation is overwritten by an image which is to be under the above image depending upon the order of image formation or whether on the contrary, an image which is to be on an image by another image formation is overwritten by the image by another image formation or not. Particularly, the judgment of overlap is essential to graphics because graphics such as a chart is based upon the overlap of picture elements. However, as overlap between any picture element constituting a screen is required to be judged, processing time in proportion to the square of the number of picture elements is required. Therefore, there is a problem that when a picture element is divided into a few hundred or more particles, an overhead required for preprocessing for the judgment of overlap is very long and the effect of high-speed processing which is the proper object of parallel processing is greatly deteriorated.

SUMMARY OF THE INVENTION

The present invention is made to solve such a problem and an object is to provide an image formation system wherein an overhead for preprocessing for the judgment of overlap is reduced as much as possible.

FIG. 1 is a block diagram showing the constitution based upon the principle of an image formation system according to the present invention.

As shown in FIG. 1, the image formation system is provided with job sequencing means 1 for creating job sequence consisting of a plurality of instruction jobs by dividing an image formation instruction, map memory 2 for writing the job sequence number of an instruction job, overlap judgment means 3 for judging overlap when a job sequence number is written to the map memory, a plurality of image formation processing means 4a, 4b, . . . , 4n for developing pixel information in units of instruction job, image memory 5 for placing pixel information in a source file and job control means 6 for controlling the allocation of an instruction job to the plurality of image formation processing means 4a, 4b, . . . , 4n and writing partial image formation information developed by the plurality of image formation processing means 4a, 4b, . . . , 4n to the image memory 5.

The map memory 2 consists of a plurality of planes which are differentiated in resolution so that the judgment of overlap can be performed in a plurality of steps.

According to the image formation system constituted as described above, an image formation instruction consisting of page description language sent from an external device is divided into a plurality of jobs by the job sequencing means 1 and a unique job sequence number is allocated to each job. The overlap judgment means 3 forms an image on the map memory 2 at coarser resolution than output resolution according to job sequence. Referring to an image at this time, as specified color and density are not required to be reproduced, the job sequence number of each job is written to data structure of each pixel, for example as the value of density. If overwriting is detected for a pixel where an image is already formed when an image of the job sequence number is formed by the judgment of overlap by the overlap judgment means 3, the sequence number for a pixel where an image is already formed in the preceding job is allocated to a job in which the image is overwritten as described later. If an image is not overwritten, the independence of a job is extracted and if an image is overwritten, the dependence of a job upon a processing order is extracted by image formation processing at such coarse resolution. When extraction is completed, image formation processing at output resolution is executed in parallel by the plural image formation processing means 4a, 4b, . . . , 4n with the dependence of extracted processing kept. The job control means 6 allocates a job to the plural image formation processing means 4a, 4b, . . . , 4n and writes partial image formation information developed by each image formation processing means 4a, 4b, . . . , 4n to the image memory 5.

According to the above constitution, as overlap between a specific image component and the other image component on the map memory with lower resolution than the resolution of output pixel information is judged when the specific image component is placed in the image memory, the speed of judgment can be accelerated, compared with the speed of judging overlap between any image component.

BRIEF DESCRIPTION OF THE DRAWINGS

FIG. 4 shows a list of image formation instructions;

FIG. 6 shows an example of a job storage table;

FIG. 10 shows an expanded job storage table;

FIG. 13 is a flowchart for explaining the operation of a coarse resolution image former; and FIG. 14 is another flowchart for explaining the operation of the coarse resolution image former.

DESCRIPTION OF THE PREFERRED EMBODIMENTS

Figure 1:
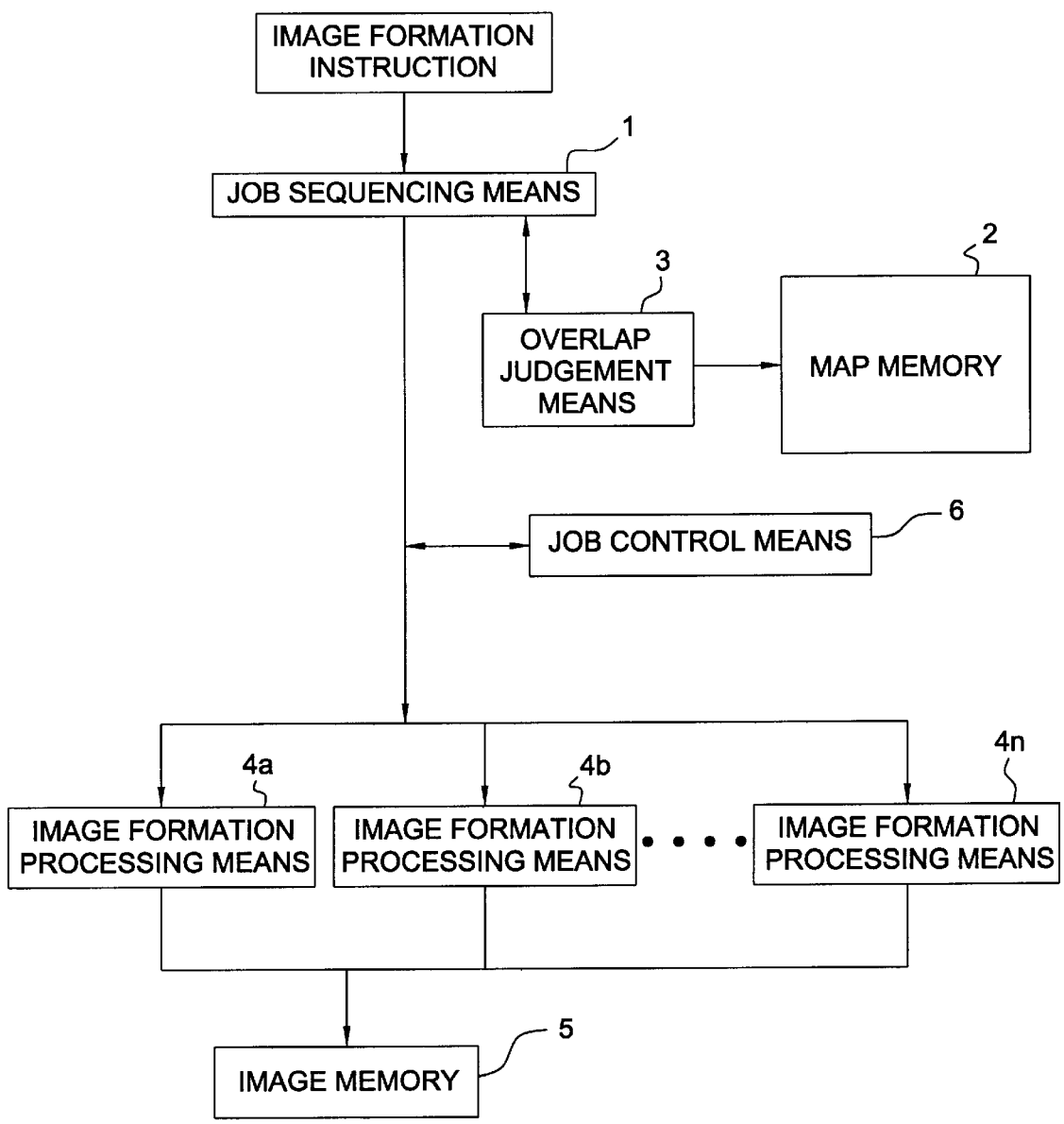
FIG. 1 is a block diagram showing the constitution based upon the principle of an image formation system according to the present invention.

First, the outline of the present invention will be described referring to the drawings.

FIG. 1 is a block diagram showing the constitution based upon the principle of an image formation system according to the present invention.

As shown in FIG. 1, the image formation system comprises job sequencing means 1 for receiving and analyzing an image formation instruction sent from an external device and creating job sequence consisting of a plurality of instruction jobs, map memory 2 for writing the job sequence number of an instruction job, overlap judgment means 3 for writing to the map memory and judging overlap at that time, a plurality of image formation processing means 4a, 4b, . . . , 4n for developing pixel information in units of instruction job, image memory 5 for placing pixel information in a source file at output resolution and job control means 6 for controlling the allocation of an instruction job to the plural image formation processing means 4a, 4b, . . . , 4n according to the independence or the dependence upon a processing order of a job for which overlap is judged and writing of partial image formation information developed by the plural image formation processing means 4a, 4b, . . . , 4n to the image memory 5.

The map memory 2 is constituted by memory with coarser resolution than output resolution and constituted so that overlap is judged by the overlap judgment means 3 in writing to a plane with low resolution. The map memory 2 consists of a plurality of planes different in resolution the resolution of which is lower than output resolution, first overlap is judged by the overlap judgment means 3 in writing to a plane with lower resolution and an image of a job for which overlap is judged is again formed on a plane with higher resolution by one level so as to judge whether an image is overwritten or not more precisely.

According to the image formation system constituted as described above, an image formation instruction sent from an external device and consisting of page description language (PDL) received by the job sequencing means 1 is divided in units of instruction, job sequence consisting of a plurality of instruction jobs is created and at that time, a unique job sequence number is allocated to each job. The overlap judgment means 3 forms an image on the map memory 2 at coarser resolution than output resolution according to job sequence. As the specified color and density of an image at this time are not required to be reproduced, the sequence number of each job is written to a data area for each pixel. If overwriting of an image on a pixel where an image is already formed is detected by the judgment of overlap by the overlap judgment means 3 in writing a sequence number, the sequence number of a job for a pixel where an image is already formed in the preceding job is allocated to a job in which an image is overwritten. The independence or the dependence upon a processing order of an instruction job in job sequence is extracted by such image formation processing at coarse resolution. When extraction is completed, image formation processing at output resolution is executed in parallel by the plural image formation processing means 4a, 4b, . . . 4n with the dependence of extracted processing kept. The job control means 6 allocates a job to the plural image formation processing means 4a, 4b, . . . , 4n and further, writes partial image formation information developed by the plural image formation processing means 4a, 4b, . . . , 4n to the image memory 5 to generate a final two-dimensional image. At this time, when an image is formed in predetermined N pieces (N≧the number n of image formation processing means) of independent image areas in the map memory 2, the job control means 6 instructs each image formation processing means 4a, 4b, . . . , 4n to generate a final generated image in each independent image area.

Next, embodiments according to the present invention will be described using a printing system roughly linked by a network as an example.

Figure 2:
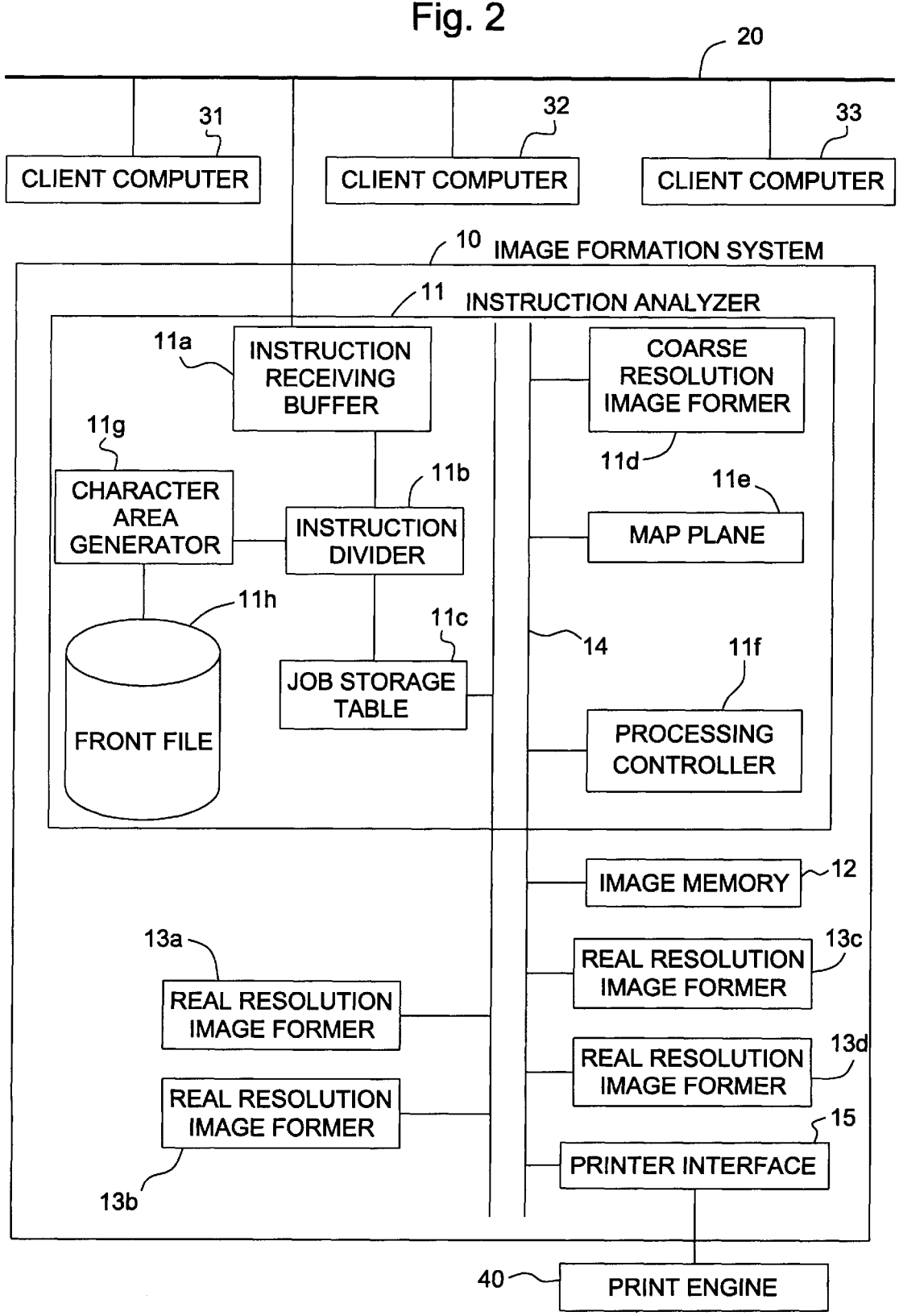
FIG. 2 is a block diagram showing a constitutional example of a printer to which the image formation system according to the present invention is applied.

FIG. 2 is a block diagram showing a constitutional example of a printing system to which the image formation system according to the present invention is applied.

Client computers 31, 32 and 33 are connected to an image formation system 10 shown in FIG. 2 via a local area network 20 and a print engine 40 for outputting the result of processing is connected to the system. An instruction analyzer 11 in the image formation system 10 is constituted by an instruction receiving buffer 11a, an instruction divider 11b, a job storage table 11c, a coarse resolution image former 11d, a map plane 11e for storing an area occupied by an image element, a processing controller 11f, a character area generator 11g and a font file 11h. The instruction analyzer 11 is connected to image memory 12 for holding a final generated image and real resolution image formers 13a, 13b, 13c and 13d for forming an image element at really output resolution via a common bus 14. A print image formed by the real resolution image former 13a, 13b, 13c and 13d is stored in the image memory 12 and is supplied to the print engine 40 via a print interface 15.

The client computers 31, 32 and 33 are user terminals for sending a print instruction to the image formation system 10. A personal computer or a workstation may be used. A user of a printer edits a desired print screen using the document editor or image editing software of the client computers 31, 32 and 33 and sends print information to the image formation system 10 as PDL program generated by a printer driver. The above PDL program is based upon, for example Post-Script (trademark of Adobe Systems).

The instruction receiving buffer 11a in the instruction analyzer 11 is buffer memory for spooling print information sent from the client computer 31, 32 or 33, that is, a PostScript instruction string. The instruction receiving buffer 11a is connected to the instruction divider 11b via an internal bus.

The instruction divider 11b is a subsystem for dividing print information received from the client computer 31, 32 or 33 as a plurality of printing jobs. A concrete example of how print information is divided as a plurality of printing jobs will be described below.

Figure 3:
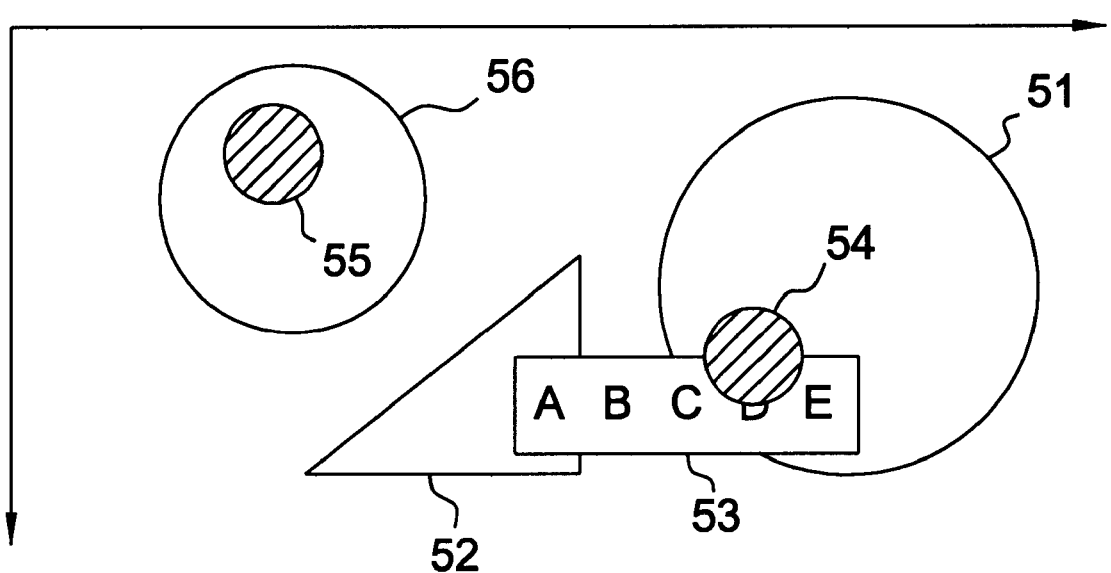
FIG. 3 shows an example of a graphic primitive where an image is formed according to print information.

FIG. 3 shows an example of a graphic primitive formed according to print information.

As shown in FIG. 3, first, a graphic primitive 51 is formed and next, graphic primitives 52, 53, 54, 55 and 56 are formed in order. The graphic primitives 51, 52, 53 and 54 are overlapped with each other and the graphic primitives 55 and 56 are formed independently without being overlapped with each other. An image formation instruction string issued to form such graphic primitives is expressed as follows:

FIG. 4 shows an image formation instruction string list.

The instruction divider 11b receives a list 60 shown in FIG. 4 as an image formation instruction string. According to this list 60, an instruction 51a for forming the graphic primitive 51, an instruction 52a for forming the graphic primitive 52, an instruction 53a for forming the graphic primitive 53, an instruction 54a for forming the graphic primitive 54, an instruction 55a for forming the graphic primitive 55 and an instruction 56a for forming the graphic primitive 56 are described in the above order. The instruction divider 11b receives such an instruction string shown in the list 60 and divides it into a plurality of instruction strings. The instruction string is divided into the smallest unit in a step in which a graphic primitive is generated. That is, as one complete graphic primitive is formed by a pair of the formation of a contour line and area "fill" inside the line by a "fill" instruction and others, this pair to which an instruction for specifying an attribute such as a color for the formation of an image is added is the smallest unit of division. It is natural that a plurality of the smallest units may be combined to be a job in the range in which overlap is not increased unnecessarily. An example of a job divided as described above will be described below.

Figure 5:
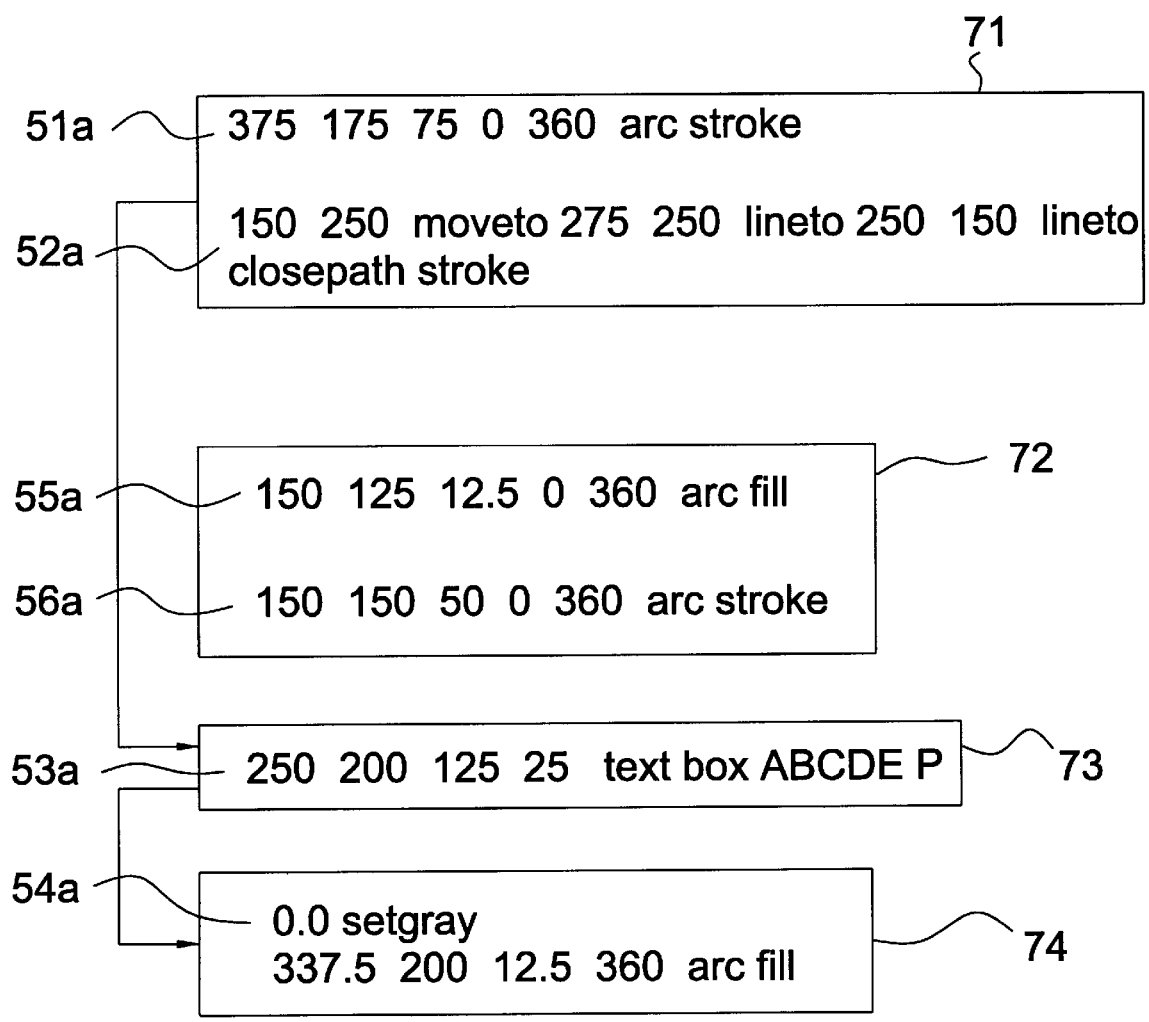
FIG. 5 shows an example of divided jobs.

FIG. 5 shows an example of a divided job.

As shown in FIG. 5, it is judged whether six image formation instruction strings shown in FIG. 4 are overlapped with each other in the order of instructions received from a client computer or not and according to the result of judgment, they are divided into four jobs 71 and 74. The jobs 71 to 74 include the dependence upon a processing order which is not clear in the step of division. As apparent from the relationship of overlap between images shown in FIG. 3, the job 73 is required to be executed after the processing of the job 71 is completed and the job 74 is required to be executed after the processing of the job 73 is completed. Such overlap between graphic primitives is analyzed by simple image formation processing described later by the coarse resolution image former 11d. The jobs 71 to 74 divided by the instruction divider 11b are stored in the job storage table 11c and an example of the job storage table 11c will be described below.

FIG. 6 shows an example of the job storage table.

The job storage table 11c is constituted by the fields of "job identifier" and "PRED." "Job identifier" is a two-byte code number for specifying each job uniquely and this code is equivalent to order in time series in an image formation instruction string before it is divided. In FIG. 6, codes 1001 to 1004 corresponding to the divided jobs 71 to 74 shown in FIG. 5 are given. It is natural that this code may be based upon another protocol if the order of jobs in time series can be simply calculated.

The identifier of a job to be executed before each job is executed is stored in the field of "PRED." That is, as a graphic form under another graphic form is processed previously in the relationship of overlap between graphic forms, the identifier of the job is stored. This field is blank anywhere at the time of division and required information is filled by the analysis of overlap using the coarse resolution image former 11d. The example shown in FIG. 6 shows that it is clear as the result of the above analysis that the job 1001 should be executed before the job 1003 and the job 1003 should be executed before the job 1004.

As shown in FIG. 2, the instruction divider 11b is provided with the character area generator 11g, the character area generator 11g is provided with the font file 11h and next, the operation will be described. For example, if a graphic form consisting of a character string is specified as the instruction 53a in FIG. 4, that is, if a graphic form including a character string "ABCDE" specified as point P is specified, the character area generator 11g generates (250, 200, 125, 25) as a rectangular character area in which the specified character is stored according to the point of a font in the font file 11h. Overlap is also judged for a graphic form of this character area as the other graphic form.

Images are formed on the map plane 11e by the coarse resolution image former 11d for the jobs stored in the job storage table 11c, it is sequentially judged whether an overlap exists between graphic primitives or not and next, the details will be described.

Figure 7:
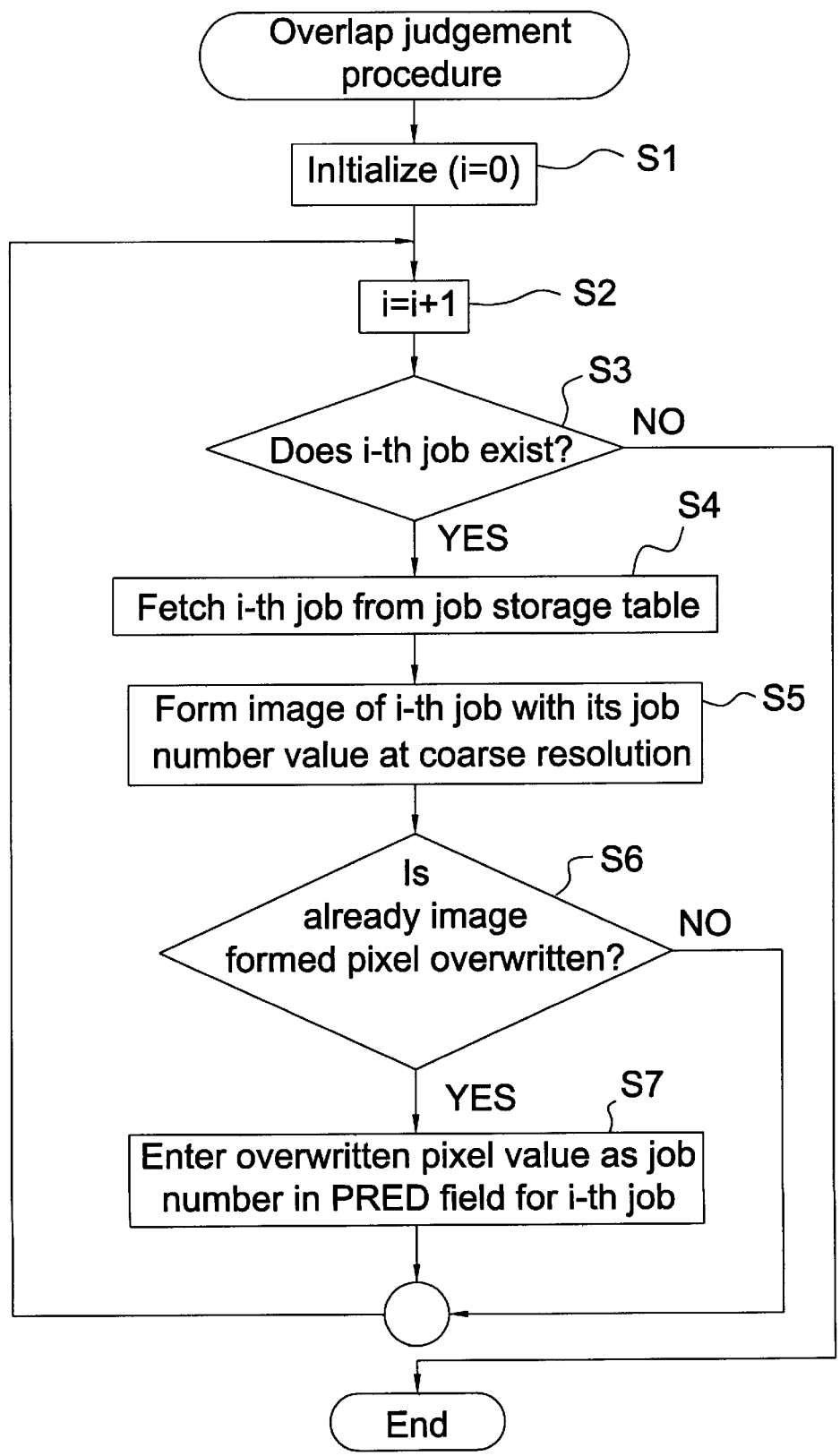
FIG. 7 is a flowchart showing an overlap judgment procedure.

FIG. 7 is a flowchart showing an overlap judgment procedure.

First, a job counter is initialized and a job buffer is also initialized in step S1. Next, the job counter is incremented by one in step S2 and it is judged in step S3 whether the i-th job exists in the job counter or not. If no i-th job exists in the job counter, processing is finished. If the i-th job exists in the job counter, the i-th job in the job counter is fetched from the job storage table 11c and is stored in the job buffer in step S4.

Next, an image of the i-th job is formed on the map plane 11e at coarser resolution than output resolution in step S5. At this time, an image with the value of its job number is formed on the map plane 11e. The map plane 11e is the arrangement of pixels constituted by 16 bits per pixel. In this case, it is constituted by pixels 128 in the direction of the x-axis ×128 in the direction of the y-axis. The number of these pixels may be increased or reduced depending upon required precision of the judgment of overlap. An image should be written to any pixel where an image is to be written at real resolution. This is a requisite condition not to miss the possibility of overlap. A value which the coarse resolution image former lid writes to a pixel is not the value of density instructed by an image formation instruction but the value itself of a job number including the image formation instruction. This is because the object of the coarse resolution image former 11d is to record what space a job occupies to form an image and to judge what jobs are overlapped spatially.

Afterward, as a result of writing to a pixel, it is judged in step S6 whether an image is overwritten to a pixel where an image is already formed or not. The case that a value is overwritten to a pixel where a pixel value P is already written in a process of image formation by the coarse resolution image former 11d, shows that the job is required to be executed after a job P. The value p is stored in the field of "PRED" in the job storage table 11c as a job identifier in step S7. As a result of judgment in step S6, if a value is not overwritten to a pixel where a value is already written and if step S7 is finished, processing is returned to step S2 and the above procedure is repeated till the last job.

Figure 8:
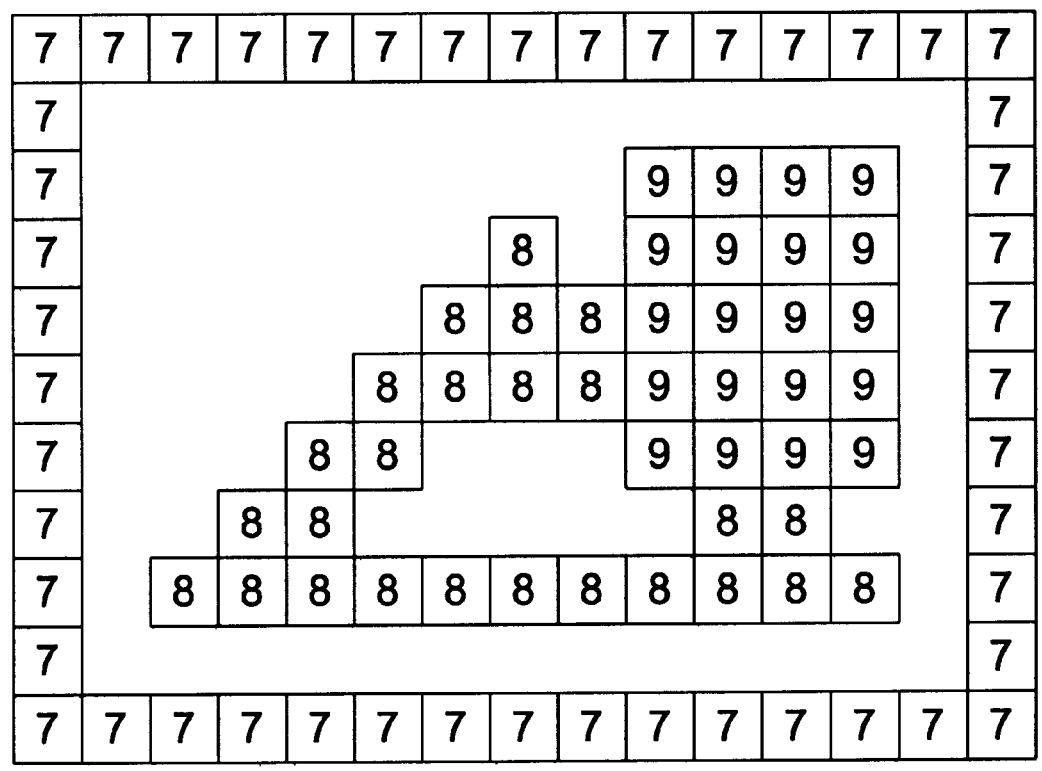
FIG. 8 is an explanatory drawing showing an example of writing to a map plane.

FIG. 8 is an explanatory drawing showing an example of writing to the map plane.

FIG. 8 shows a state in which job numbers 7 to 9 corresponding to a rectangle (the seventh job), a triangle (the eighth job) and area "fill" inside the rectangle (the ninth job) are written on the map plane 11e by the coarse resolution image former 11d. In this case, a triangle (the eighth job) is formed inside a rectangle (the seventh job) and an area inside another rectangle is filled (the ninth job). As the rectangle filled in the ninth job overwrites the triangle (the eighth job), it is detected at that time that the eighth job should precede the ninth job and the eighth job is entered in the field of "PRED" for the ninth job in the job storage table 11c.

In this embodiment, as the pixel value of the map plane is two bytes, only overlap between $2^{16}$ pieces of instruction strings can be judged. To avoid this restriction, the width of a pixel value may be further widened or after the instruction divider 11b roughly divides a job from a client computer into a few pieces, further the divided job may be divided into $2^{16}$ pieces.

The group of jobs for which the coarse resolution image former 11d judges that images are overlapped is collected in the job storage table 11c shown in FIG. 6. The data of such group of jobs is sent to the real resolution image formers 13a to 13d in addition to the job storage table 11c. The real resolution image formers 13a to 13d process each job keeping the dependence shown in the job storage table 11c. A partial image generated by the real resolution image formers 13a to 13d is written to the image memory 12. When the last job is completed, images are sent to the print engine 40 via the printer interface 15 and printed.

Next, the operation of the processing controller 11f in the instruction analyzer 11 will be described. Unique division and allocation of a job is performed by this processing controller 11f. That is, when jobs of a predetermined number N are judged, the group of divided jobs is allocated to the real resolution image formers by the processing controller 11f. It is so that time required for the analysis of overlap is prevented from being long and actual image formation processing is started as early as possible. The predetermined number N may be an arbitrary value equal to or larger than the number n of the real resolution image formers. If the predetermined number is smaller than the number n of the real resolution image formers, it is desirable that N is equal to n or the multiple of n because an image may be generated by the real resolution image former which is not engaged in processing.

Figure 9:
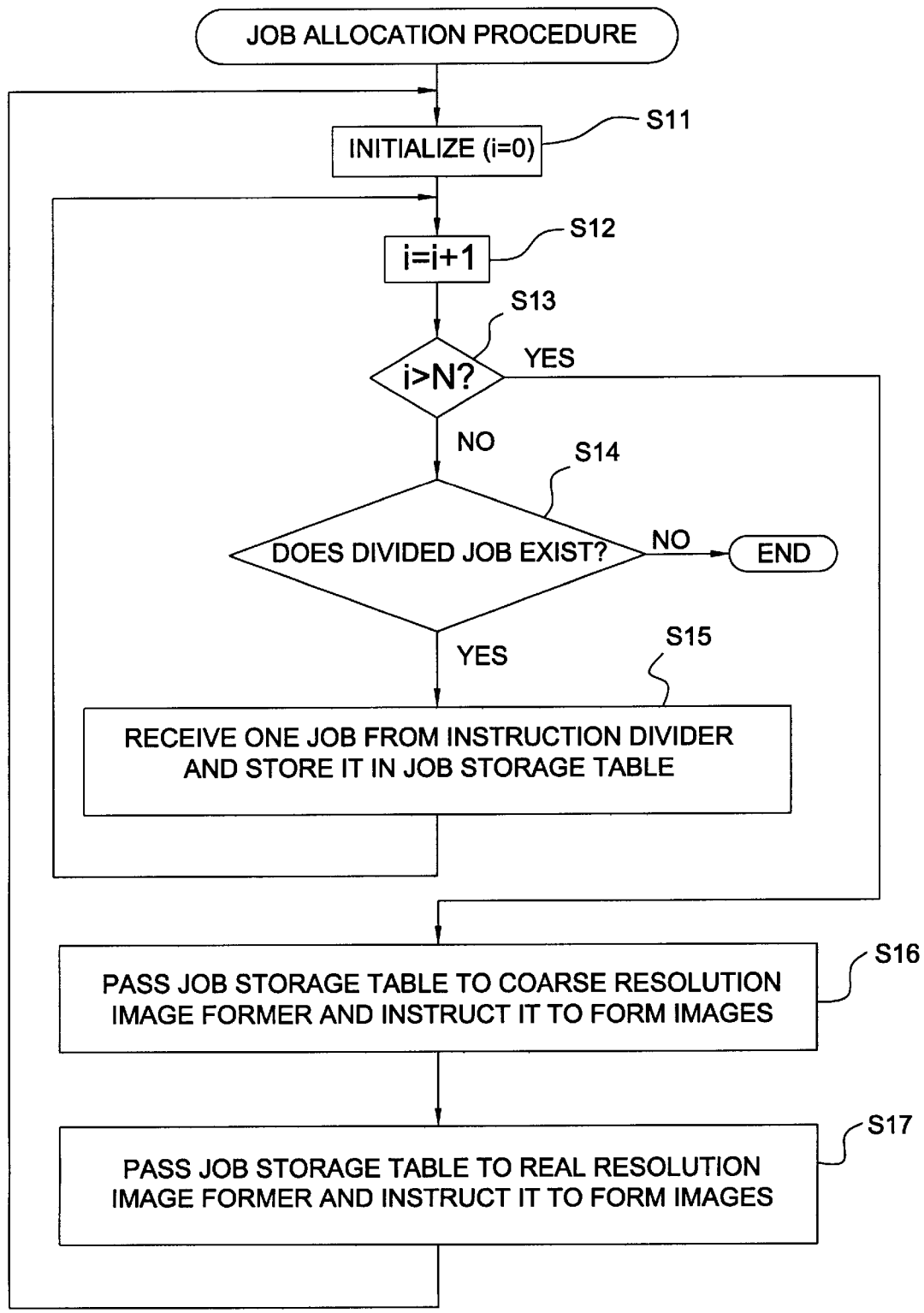
FIG. 9 is a flowchart showing a job allocation procedure by a processing controller.

Next, a process in which the processing controller 11f allocates a job to the real resolution image formers 13a to 13d will be described referring to FIG. 9. In FIG. 9, a procedure in which N pieces of jobs are collectively allocated is shown.

FIG. 9 is a flowchart showing a procedure in which a job is allocated by the processing controller.

The processing controller 11f first initializes the job counter and also initializes the job buffer in step S11. Next, the job counter is incremented by one in step S12 and it is judged in step S13 whether the value of the job counter i exceeds N or not. If i does not exceed N, it is judged in step S14 whether a job divided by the instruction divider 11b exists or not. If no divided job exists, this procedure is finished. If such divided job exists, one job is received from the instruction divider 11b and stored in the job storage table 11c in step S15. Afterward, processing is returned to step S12 and the above operation is repeated until the value of the counter is N. Identification codes are stored in the job storage table 11c as described above and when it is judged that N pieces of identification codes are stored in step S13, an image formation instruction is issued to the coarse resolution image former 11d in step S16. The coarse resolution image former 11d analyzes the relationship of overlap by forming an image on the map plane 11e and stores dependence between jobs obtained as a result in the job storage table 11c. When the dependence of N pieces of jobs is analyzed, an image formation starting instruction is respectively sent to the real resolution image formers 13a to 13d and each real resolution image former 13a, 13b, 13c and 13d executes image formation processing on the image memory 12 at output resolution in step S17, referring to the job storage table 11c in the instruction analyzer 11.

The processing controller 11f issues image formation starting instructions to the respective real resolution image formers 13a to 13d and expands the job storage table as follows.

FIG. 10 shows an expanded job storage table.

In the expanded job storage table shown in FIG. 10, the field "CMPLT" is added to the fields of "job identifier" and "PRED." In this field of "CMPLT," flag information showing a processing completed state of each job is stored and it is shown whether the processing of each job is completed (CMPLT=1) or not (CMPLT=0). The example shown in FIG. 10 shows that the processing till the second job the job identifier of which is 1002 is completed. Each real resolution image former sends the completion of the processing of each job to the processing controller 11f, the processing controller 11f receives it and updates the field "CMPLT." Each real resolution image former can keep dependence upon the order of processing by starting image formation processing after the state of each preceding job stored in the field "PRED" is checked in the field "CMPLT."

Next, a second embodiment of an image formation system will be described.

Figure 11:
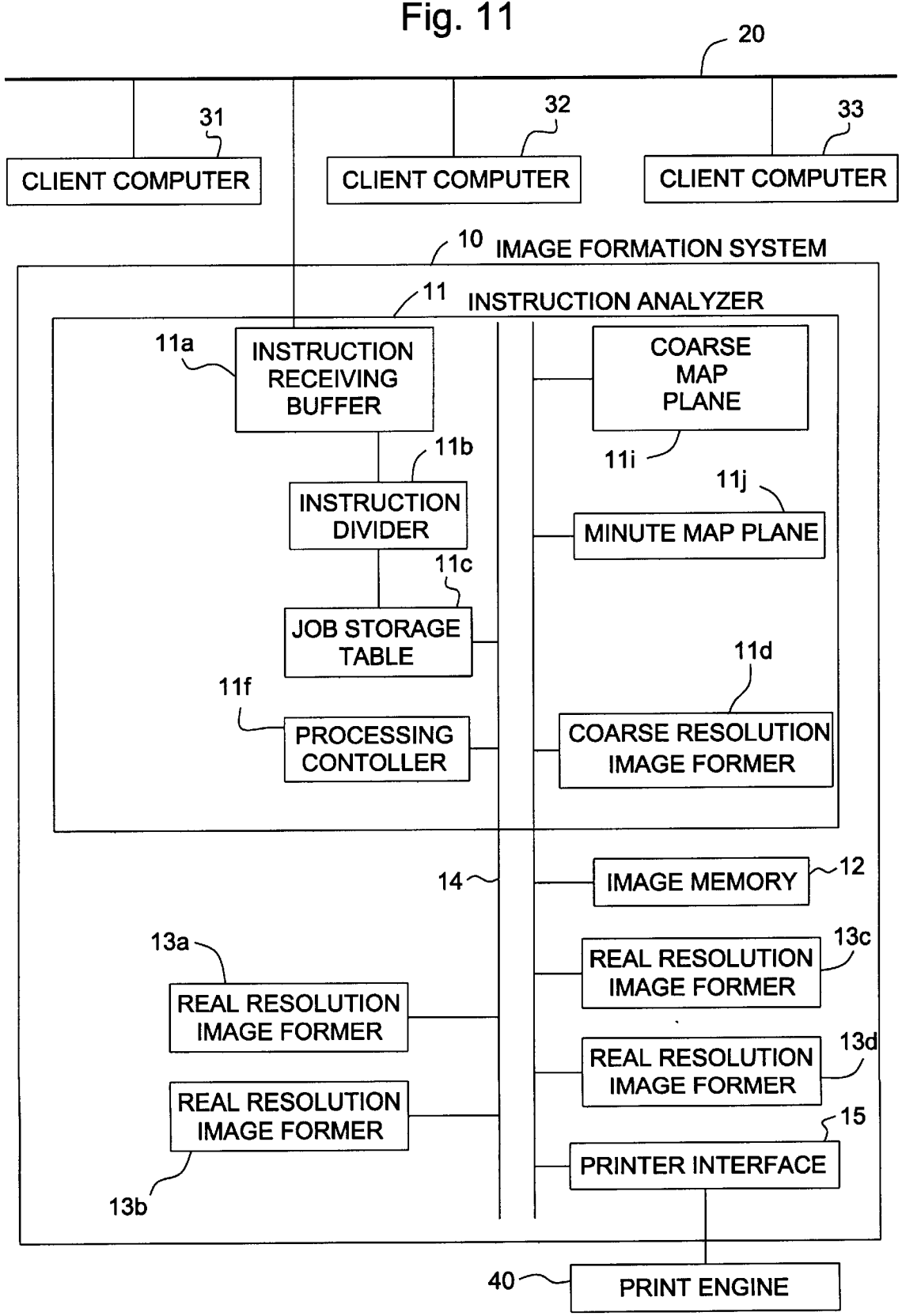
FIG. 11 is a block diagram showing a constitutional example of a printer to which another image formation system is applied.

FIG. 11 is a block diagram showing a constitutional example of a printing system to which another image formation system is applied.

In FIG. 11, the same reference number is allocated to the same or similar component as that in the first embodiment shown in FIG. 2. An image formation system 10 is connected to client computers 31 to 33 via a local area network 20. An instruction analyzer 11 in the image formation system 10 is constituted by an instruction receiving buffer 11a, an instruction divider 11b, a job storage table 11c, a coarse resolution image former 11d for forming an image forming element at two levels of resolution, a coarse map plane 11i and a minute map plane 11j for storing an area which an image forming element occupies and a processing controller 11f. The instruction analyzer 11 is connected to image memory 12 for holding a final generated image and real resolution image formers 13a to 13d for forming an image forming element at output resolution via a common bus 14. A print image formed by the real resolution image formers 13a to 13d is stored in the image memory 12 and the image memory 12 is connected to a print engine 40 via a printer interface 15. Each subsystem constituting this image formation system will be described below.

As the instruction receiving buffer 11a, the instruction divider 11b and the job storage table 11c are the same as those in the embodiment shown in FIG. 2, description thereof will be omitted. The object of the present invention is to judge overlap in multiple steps efficiently and further to form a final image continuously.

The coarse map plane 11i and the minute map plane 11j shown in FIG. 11 are coarser than actual resolution (the resolution of the image memory 12) and memory for image formation with different two types of resolution. An example of writing to these map planes will be described below.

Figure 12:
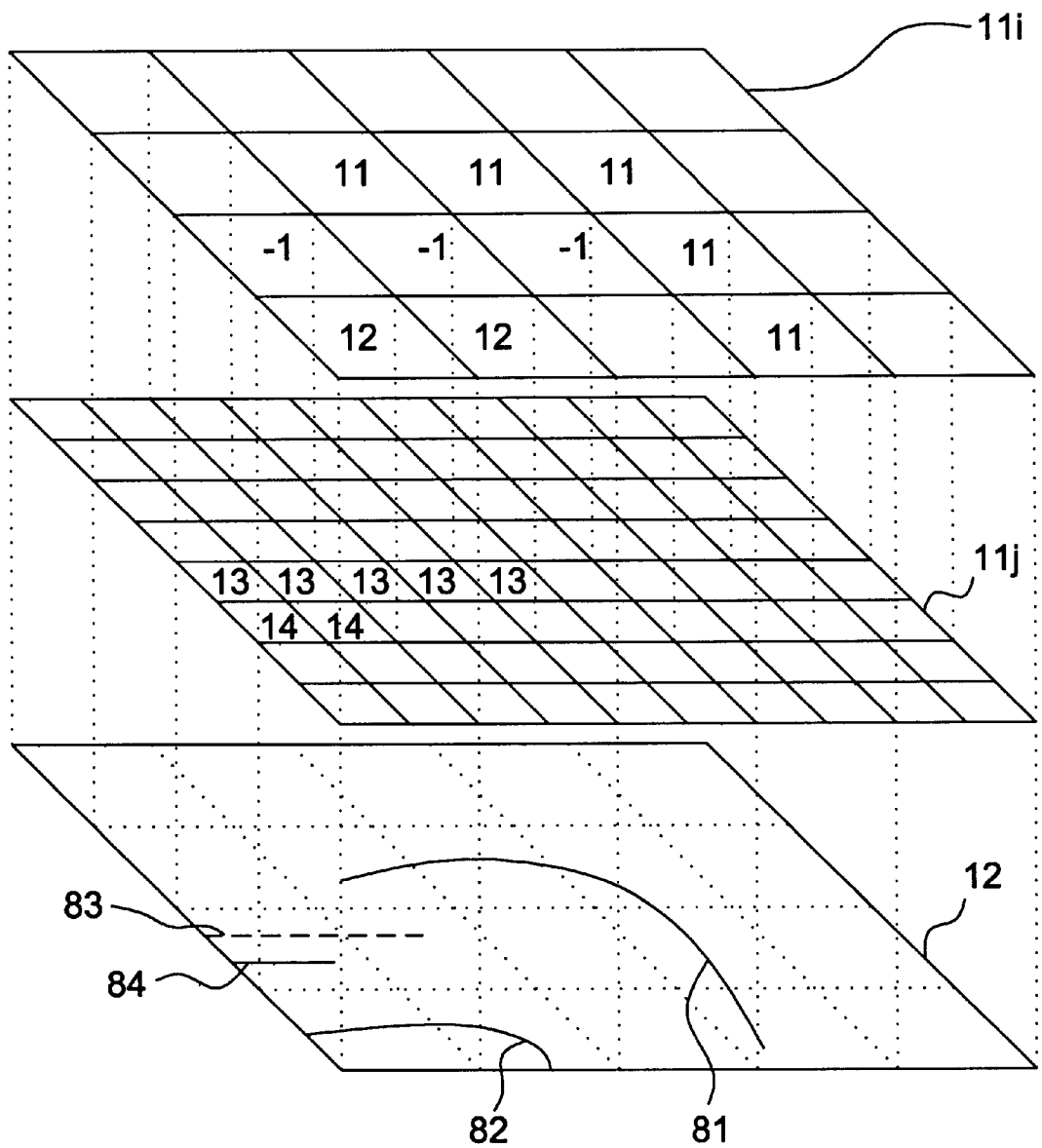
FIG. 12 is an explanatory drawing showing a state in which information is written to a plurality of map planes.

FIG. 12 is an explanatory drawing showing a state in which a value is written to a plural map planes.

In the explanatory drawing shown in FIG. 12, the uppermost map plane is the coarse map plane 11i and the middle one is the minute one 11j. Under them, the image memory 12 in which an output image is formed is shown to contrast the output image with the values on them. The coarse map plane 11i is provided with, for example the resolution of 2 dots per inch (dpi) and the minute map plane 11j is provided with the resolution of 36 dpi, each is provided with the number of pixels equivalent to the paper size of A3 and the respective areas in which an image is formed in the image memory 12 are represented by different precision.

In this embodiment, two map planes are used, however, it need scarcely be said that even if three or more map planes are used when the number of pixels of a target image is many, the present invention can be executed effectively. A numeric value placed in the position of each pixel denotes the identification code of a job in which each image forming element is formed. That is, if a graphic form to be formed in the image memory 12 in the eleventh job is a graphic element 81, a graphic form to be formed in the twelfth job is a graphic element 82, a graphic form to be formed in the thirteenth job is a graphic element 83 and a graphic form to be formed in the fourteenth job is a graphic element 84, as a graphic form independently formed in the same pixel area on the coarse map plane 11i is the graphic elements 81 and 82, "11" and "12" showing the eleventh and twelfth jobs are written to the corresponding pixels. In the meantime, as the graphic elements 83 and 84 are formed in the same pixel area on the coarse map plane 11i, "13" and "14" showing the thirteenth and fourteenth jobs are written to the corresponding pixels on the minute map plane 11j. To show that graphic elements are overlapped on the coarse map plane 11i, a predetermined code different from their job number, "−1" in FIG. 12 is overwritten to the corresponding pixel area. A procedure in which the coarse resolution image former 11d judges overlap realizing the two map planes will be described in detail below.

FIGS. 13 and 14 are flowcharts for explaining the operation of the coarse resolution image former.

The coarse resolution image former 11d first initializes a job counter and also initializes a job buffer in step S21. Next, the job counter is incremented by one in step S22 and it is judged in step S23 whether the i-th job exists in the job counter or not. If no i-th job exists in the job counter, processing is finished. If the i-th job exists in the job counter, a job is fetched in order from a job with the smallest identifier from the job storage table 11c and stored in the job buffer in step S24. Next, an image of the fetched job Ji is formed on a map plane at coarse resolution 2 dpi or at minute resolution 36 dpi in step S25. This process will be described in detail below referring to FIG. 14.

In the process for image formation, the minute map plane is scanned when another value is overwritten, writing a pixel value by one pixel on the coarse map plane 11i at coarse resolution 2 dpi for the job Ji. First, it is judged whether a pixel to be written to the coarse map plane is left or not in step S26 and if no pixel is left, this processing is escaped. If a pixel to be written to the coarse map plane is left, its job number i is written to one pixel on the coarse map plane 11i as a pixel value in step S27. At that time, it is judged in step S28 whether its job number is overwritten to any pixel or not and if the pixel is not overwritten, processing is returned to step S26. If the pixel is overwritten, it is checked in step S29 whether the overwritten pixel value Px is negative or not. If Px is not negative, that is, if its job number is the number of the preceding job, "−1" is overwritten to the pixel value Px in step S30. The numeric value of "−1" shows that the interference of image formation processing occurs in the pixel on the coarse map plane 11i and the reference of the minute map plane is required for the determination of the preceding job. The identification codes of the jobs Ji and Jpx for one pixel area on the coarse map plane 11i are written to the minute map plane 11j with the resolution of 36 dpi in step S31. The contents written at this time are the identification numbers i and Px of the jobs, first the identification number of the job Jpx is written and next, that of the job Ji is written. It is judged in step S32 whether a pixel on the minute map plane 11j is overwritten or not when the identification numbers are written, if the pixel is not overwritten, processing is returned to step S26 and processing proceeds to writing to the next pixel on the coarse map plane 11i. When it is judged that a pixel is overwritten in writing to the pixel on the minute map plane 11j, it is concluded that the job Ji is overlapped with the job Jpx and the identification code of Px is written in the field of "PRED" in the job storage table 11c in step S33.

If Px is negative in judgment in step S29, the identification number of the job Ji for one pixel area on the coarse map plane 11i is written to the minute map plane 11j with the resolution of 36 dpi in step S34. The contents written at this time are the identification number i. Afterward, if it is judged in step S32 that a pixel (a pixel value k) on the minute map plane is overwritten when the identification number is written, it is concluded that the job Ji is overlapped with a job Jk and an identification code k is written in the field of "PRED" in the job storage table 11c in step S33.

When the above process is applied to any job in the job storage table 11c, any overlap between jobs can be analyzed.

The group of jobs the analysis of overlap between which is finished is allocated to the real resolution image formers 13a to 13d shown in FIG. 11 keeping the dependence and a partial image generated by each job is written to the image memory 12. When the last job is completed, images are sent to the print engine 40 via the printer interface 15 and printed.

The image formation system according to the present invention which is described above is provided with map memory with coarser resolution than the resolution of an output image and overlap judgment means for simultaneously writing the sequence number of a job received from job sequencing means to the map memory and judging overlap between image forming elements depending upon whether a pixel where an image is already formed at that time is overwritten or not. Hereby, the detection of image forming elements overlapped with each other can be executed efficiently based upon the result beforehand written at coarse resolution and parallel processing of image formation which is the proper object can be executed without harming the effect.

What is claimed is:

1. An image formation system for obtaining pixel information by raster-scanning a source file consisting of image formation instructions described with page description language, comprising:

job sequencing means for dividing said image formation instruction in units of instruction and creating job sequence consisting of a plurality of instruction jobs of said image formation instruction;

map memory for writing the job sequence number of said instruction job consisting of pixels corresponding to said pixel information;

overlap judgment means for judging the job sequence number of which instruction job is overwritten to said map memory when the job sequence number of an arbitrary instruction job is written to said map memory;

plural image formation processing means for developing pixel information in units of said instruction job;

image memory for developing pixel information in said source file; and job control means for allocating said instruction job to said plural image formation processing means according to the result of judgment by said overlap judgment means and writing partial image formation information developed by said plural image formation processing means to said image memory.

2. An image formation system according to claim 1, wherein said job control means first writes a instruction job judged to be no overlap by said overlap judgment means to said image memory.

3. An image formation system according to claim 1, wherein said job control means first writes an overwritten instruction job judged to be overlap by said overlap judgment means to said image memory.

4. An image formation system according to claim 1, wherein the resolution of said map memory is lower than that of output pixel information.

5. An image formation system according to claim 1, wherein said map memory is constituted by a plurality of planes different in resolution, and said overlap judgment means is constituted so that further detailed overlap judgment is enabled by rewriting a predetermined code other than the job sequence number to a pixel if the pixel where a job sequence number is already written is overwritten when a job sequence number is written to each plane and by rewriting the predetermined code to a plane with higher resolution by one level together with job sequence the job sequence number of which is already written.

6. An image formation system according to claim 1, wherein said job control means instructs each image formation processing means to form an image of each job at output resolution when job sequence numbers of a predetermined number which is equal to or larger than the number of said image formation processing means are written to said image memory.

7. An image formation system according to claim 1, wherein said job sequencing means is provided with a character area generator and a font file, and if a graphic form including a character string is specified, said character area generator generates job sequence in a graphic area including said specified character string based upon font data in said font file.

8. An instruction analyzer for obtaining pixel information by raster-scanning a source file consisting of image formation instructions described with page description language, comprising:

job sequencing means for dividing said image formation instruction in units of instruction and creating job sequence consisting of a plurality of instruction jobs of said image formation instruction;

map memory for writing the job sequence number of said instruction job consisting of pixels corresponding to said pixel information;

overlap judgment means for judging the job sequence number of which instruction job is overwritten to said memory map when the job sequence number of an arbitrary instruction job is written to said map memory; and job control means for allocating said instruction job to plural image formation processing means for developing pixel information in units of said instruction job according to the result of judgment by said overlap judgment means and writing partial image formation information developed by said plural image formation processing means to image memory for developing pixel information in said source file.

9. An instruction analyzing method for analyzing to allocate an image formation instruction to a plurality of image formation processors in an image formation system for receiving said image formation instruction and generating a two-dimensional image by said plurality of image formation processors, said instruction analyzing method comprising the steps of:

extracting partial instruction sequence from said image formation instruction to allocate a unique identification code to each instruction sequence;

receiving said instruction sequence in order to write the identification code to image memory constituted at coarser resolution than that of a final generated image; and judging overlap by allocating the identification code of an overwritten pixel to first instruction sequence as instruction sequence to be executed after second instruction sequence is executed when a pixel written by the second already executed instruction sequence is overwritten in writing the first instruction sequence.

10. An instruction analyzing method according to claim 9, wherein in said step of judging overlap, overlap is again judged by rewriting a code meaning overwriting to a pixel if the pixel where a job sequence number is already written is overwritten in writing instruction sequence to a plane with low resolution and by rewriting the code to a plane with higher resolution by one level together with the instruction sequence of the overwritten pixel.

11. An instruction analyzing method according to claim 10, wherein in said step of judging overlap, overlap is again judged by rewriting a code meaning overwriting to a plane with higher resolution by one level if the code meaning overwriting is further overwritten in writing instruction sequence to a plane with low resolution.

12. An instruction analyzing method according to claim 9, further including the step of instructing each image formation processor to write a predetermined number of instruction sequences at output resolution after instruction sequences of a predetermined number which is equal to or larger than the number of said image formation processors is written to said image memory and overlap is judged.

* * * * *